United States Patent
Mitsugi et al.

(10) Patent No.: US 7,636,773 B2
(45) Date of Patent: Dec. 22, 2009

(54) INFORMATION TRANSMISSION APPARATUS AND INFORMATION TRANSMISSION METHOD

(75) Inventors: Tatsuya Mitsugi, Tokyo (JP); Chikako Takeuchi, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1038 days.

(21) Appl. No.: 10/758,220

(22) Filed: Jan. 16, 2004

(65) Prior Publication Data

US 2004/0174319 A1    Sep. 9, 2004

(30) Foreign Application Priority Data

Jan. 21, 2003    (JP)    ............... 2003-012589

(51) Int. Cl.
*G06F 15/177*    (2006.01)
(52) U.S. Cl. .................. 709/221; 709/220; 709/222; 709/236; 345/1.1
(58) Field of Classification Search ......... 709/220–222, 709/236; 345/1.1
See application file for complete search history.

(56) References Cited

U.S. PATENT DOCUMENTS

| | | | | | |
|---|---|---|---|---|---|
| 5,534,912 | A | * | 7/1996 | Kostreski | .................... 725/106 |
| 5,594,491 | A | * | 1/1997 | Hodge et al. | ................. 725/103 |
| 5,751,282 | A | * | 5/1998 | Girard et al. | ................. 715/721 |
| 5,752,160 | A | * | 5/1998 | Dunn | .......................... 725/93 |
| 5,935,206 | A | * | 8/1999 | Dixon et al. | ................. 709/219 |
| 6,211,901 | B1 | * | 4/2001 | Imajima et al. | ............... 725/93 |
| 6,233,735 | B1 | * | 5/2001 | Ebihara | ...................... 725/101 |
| 6,263,497 | B1 | * | 7/2001 | Maeda et al. | ................ 717/170 |
| 7,136,042 | B2 | * | 11/2006 | Magendanz et al. | ......... 345/100 |
| 7,254,622 | B2 | * | 8/2007 | Nomura et al. | ............. 709/219 |
| 2001/0027561 | A1 | * | 10/2001 | White et al. | .................... 725/1 |
| 2001/0042113 | A1 | * | 11/2001 | Cesar et al. | ................. 709/221 |
| 2003/0014762 | A1 | | 1/2003 | Conover et al. | |
| 2004/0031028 | A1 | * | 2/2004 | Hunt et al. | ................... 717/170 |

FOREIGN PATENT DOCUMENTS

| | | |
|---|---|---|
| EP | 0 633 694 B1 | 1/1999 |
| EP | 1 045 555 A2 | 10/2000 |
| EP | 1 071 288 A2 | 1/2001 |
| EP | 1071288 A2 * | 1/2001 |
| GB | 2 251 532 A | 8/1992 |
| JP | 10-326155 A | 12/1998 |
| JP | 11-313060 A | 9/1999 |
| JP | 2001-237887 A | 8/2001 |
| JP | 2001-320367 A | 11/2001 |
| JP | 2002-261717 A | 9/2002 |

* cited by examiner

*Primary Examiner*—Dohm Chankong
*Assistant Examiner*—Brian P Whipple
(74) *Attorney, Agent, or Firm*—Sughrue Mion, PLLC (57) ABSTRACT

An image transmission apparatus receives a request for transmission of an image source from either one of a plurality of monitors (109 to 112) having respective inherent addresses by way of a common cable (108) via which the image transmission apparatus is connected with the plurality of monitors, analyzes both requested image source identification information indicating the requested image source and a monitor address, which are associated with the image source transmission request, refers to a storage unit (107) for storing one or more arrays each indicating a correspondence between one of a plurality of image sources and one or more monitor addresses based on analysis results, and transmits the requested image source to the monitor while adding corresponding monitor addresses to the image source.

18 Claims, 8 Drawing Sheets

| F(n) | EV(n) | AD(n) |
|------|-------|-------|
| F(0) | IMAGE SOURCE A | M1, M2 |
| F(1) | IMAGE SOURCE B | M3 |
| F(2) | | |
| F(3) | | |
| ⋮ | ⋮ | ⋮ |

INFORMATION TRANSMISSION APPARATUS AND INFORMATION TRANSMISSION METHOD

BACKGROUND OF THE INVENTION

1. Field of the Invention

The present invention relates to an information transmission apparatus for and an information transmission method of transmitting information that can change with time, such as image information or voice information.

2. Description of Related Art

A time slot generating apparatus that can specify conditions of an issue or stop of a data transmission request has been put forth, as a technology associated with prior art information transmission apparatus and information transmission methods, in order to check the functionality and operation of a system. When original data are divided into a plurality of parts and they are stored in a plurality of storage units, respectively, the time slot generating apparatus generates time slots as time units and then transmits parallel data from the plurality of storage units by performing timing control based on those time slots. As a result, the time slot generating apparatus can transmit the original data at a data transmission rate that exceeds a data transmission rate that each storage unit can provide. The time slot generating apparatus is provided with a register used for operation checking, which specifies time slots in which parallel data transmission is carried out, and carries out transmission of parallel data from the plurality of storage units only in the time slots specified by the register used for operation checking, thereby being able to check the functionality and operation of a system (refer to Japanese patent application publication (TOKKAIHEI) No. 10-326155 (first page and FIG. 1)).

A problem with prior art information transmission apparatus and information transmission methods is however that though only one connection line is required when only one party at the other end of connection receives transmitted information, when a plurality of parties at the other ends of connection receive transmitted information, a plurality of connection lines are required and the number of connection lines increases with an increase in the number of parties at the other ends of connection. Another problem is that when transmitting the same transmission information to a plurality of parties at the other ends of connection, it is necessary to transmit the same transmission information to each of the plurality of parties at the other ends of connection several times.

SUMMARY OF THE INVENTION

The present invention is proposed to solve the above-mentioned problems, and it is therefore an object of the present invention to provide an information transmission apparatus for and an information transmission method of being able to transmit information to a plurality of recipients by way of only one connection line.

It is another object of the present invention to provide an information transmission apparatus for and an information transmission method of being able to, even when transmitting identical information to a plurality of recipients, prevent repeated transmission of the identical information.

In accordance with one aspect of the present invention, there is provided an information transmission apparatus including: a request analyzing unit for receiving an instruction including both a request for transmission of specific information and an identifier from one of a plurality of information processing apparatus connected with the information transmission apparatus by way of a common connection line, the identifier identifying the information processing apparatus that has made the transmission request and the plurality of information processing apparatus having their respective identifiers, and for analyzing the specific information to be transmitted and the identifier associated with the instruction; a storage unit for storing array data about arrays each indicating a correspondence between one of a plurality of different pieces of information to be transmitted and at least an identifier identifying one of the plurality of information processing apparatus; an information addition unit for adding the identifier associated with the instruction to the specific information associated with the instruction by referring to the storage unit based on analysis results from the request analyzing unit; and an information transmission unit for transmitting the specific information to which the identifier is added to the information processing device which has provided the instruction to the information transmission apparatus.

Therefore, the present embodiment offers an advantage of being able to, even when a plurality of recipients make a request for transmission of image sources, transmit the image sources to them by way of the single connection line. The present embodiment offers another advantage of being able to, even when transmitting an identical image source to plurality of recipients, prevent the same image source from being repeatedly transmitted to the plurality of recipients, thereby greatly reducing the number of times that a transmission process is carried out.

In accordance with another aspect of the present invention, there is provided an information transmission method including the steps of: receiving an instruction including both a request for transmission of specific information and an identifier from one of a plurality of information processing apparatus connected with one another by way of a common connection line, the identifier identifying the information processing apparatus that has made the transmission request and the plurality of information processing apparatus having their respective identifiers; analyzing the specific information to be transmitted and the identifier associated with the instruction; storing array data about arrays each indicating a correspondence between one of a plurality of different pieces of information and at least an identifier identifying one of the plurality of information processing apparatus; adding the identifier associated with the instruction to the specific information associated with the instruction by referring to the array data based on analysis results obtained in the step of analyzing; and transmitting the specific information associated with the instruction to which the identifier is added to the information processing device which has provided the instruction.

Therefore, the present embodiment offers an advantage of being able to, even when a plurality of recipients make a request for transmission of image sources, transmit the image sources to them by way of the single connection line. The present embodiment offers another advantage of being able to, even when transmitting an identical image source to plurality of recipients, prevent the same image source from being repeatedly transmitted to the plurality of recipients.

Further objects and advantages of the present invention will be apparent from the following description of the preferred embodiments of the invention as illustrated in the accompanying drawings.

DETAILED DESCRIPTION OF THE PREFERRED EMBODIMENTS

The preferred embodiments of the invention will now be described with reference to the accompanying drawings.

Embodiment 1.

Figure 1:
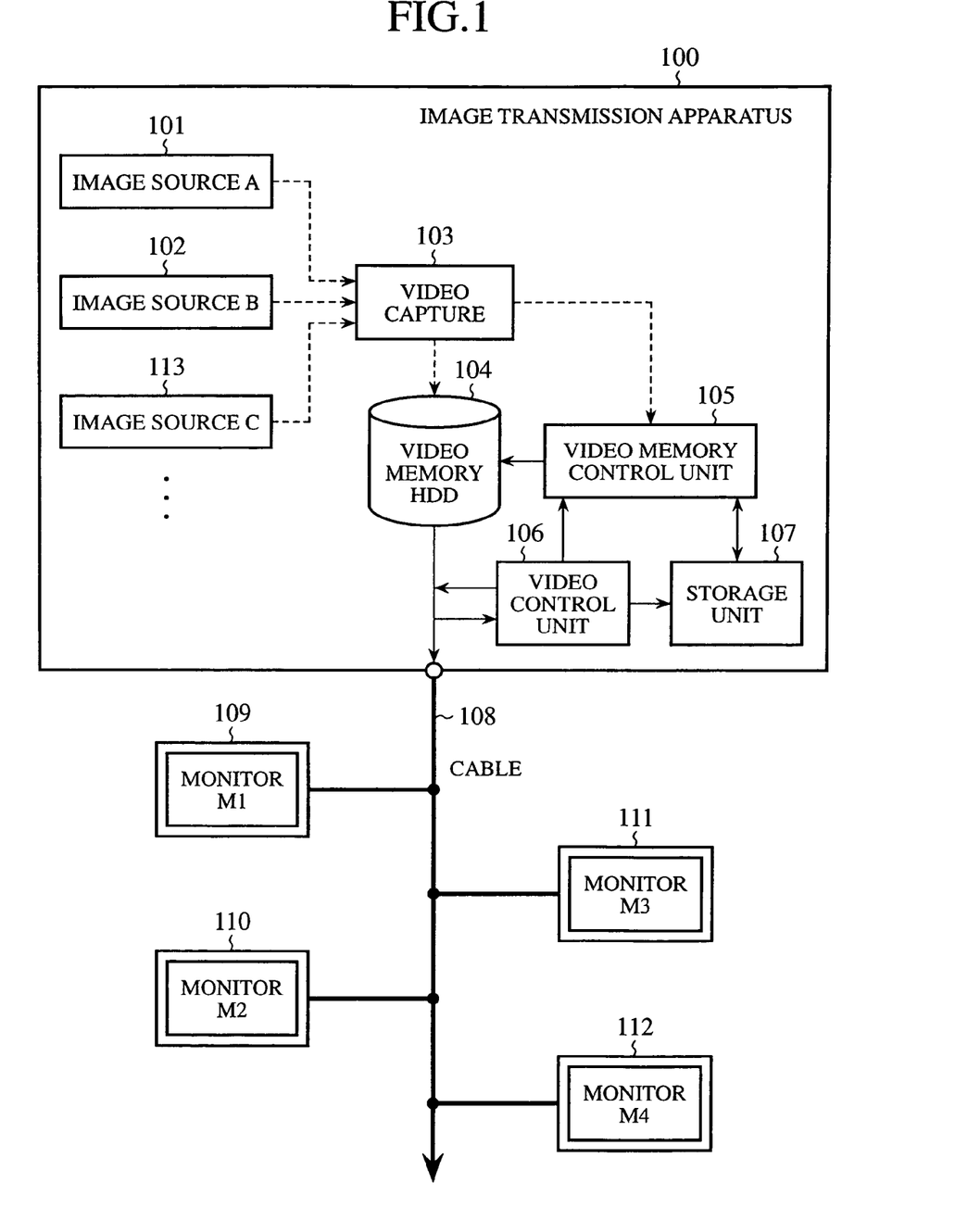
FIG. 1 is a block diagram showing the system configuration of an information transmission apparatus in accordance with embodiment 1 of the present invention.

FIG. 1 is a block diagram showing the structure of an image transmission apparatus that is an information transmission apparatus in accordance with embodiment 1 of the present invention. As shown in this figure, the image transmission apparatus (i.e., the information transmission apparatus) is provided with a plurality of image sources (i.e., transmission information), such as an image source A 101 and an image source B 102, a video capture unit 103, a video memory 104, a video memory control unit 105 (i.e., information adding means), and a video control unit 106 (i.e., request analyzing means and information transmission means) and a storage unit 107 (i.e., storage means).

A single cable 108 (i.e., a connection line) connects the image transmission apparatus 100 with a monitor 109, a monitor 110, a monitor 111, and a monitor 112 that are a plurality of display units (i.e., information processing devices). In addition, addresses (i.e., identifiers) M1, M2, M3, and M4 are provided to the plurality of monitors 109, 110, 111, and 112, respectively. Therefore, the plurality of monitors 109 to 102 are distinguished from one another by using their addresses in the following explanation, and are referred to as the monitor M1, the monitor M2, the monitor M3, and the monitor M4, respectively.

Next, a description will be made as to an operation of the image transmission apparatus in accordance with embodiment 1 of the present invention. The video capture unit 103 stores image sources, such as the image source A 101 and the image source B 102, in the video memory 104 which consists of a hard disk, and then transmits address information indicating addresses of the video memory, at which the image sources, such as the image source A101 and the image source B102, are stored, to the video memory control unit 105. The video memory control unit then 105 stores the address information indicating the addresses of the video memory at which the image sources are stored in the storage unit 107. When receiving requested image source information (i.e., information including information (referred to requested image source identification information) indicating a requested image source and information (referred to as requesting monitor address information from here on) indicating the address of a monitor that has made a request for transmission of the image source) is transmitted from the video control unit 106, the video memory control unit 105 adds addresses, which vary in the order that parts of the requested image source are read from the video memory 104, to the parts of the requested image source stored in the video memory 104 based on address information indicating the address of the video memory at which the requested image source is stored in the storage unit 107.

Every time when an image source transmission request event generated by one of the plurality of monitors M1, M2, M3, and M4 is transmitted thereto by way of the cable 108, the video control unit 106 analyzes requested image source identification information and requesting monitor address information associated with the image source transmission request event. When the requested image source identification information matches requested image source identification information of an array included in requested image source information array data (i.e., a group of arrays each consisting of a pair of requested image source identification information and requesting monitor address information) which are stored in the storage unit 107, the video control unit 106 makes a correction to the requesting monitor address information of the array so as to update the array. All arrays included in the requested image source information array data have different pieces of requested image source identification information, which identify different image sources, respectively, as the first items thereof. The video control unit 106 then calculates the number of valid requested image source information arrays included in the array data, i.e., the number of requested image sources and stores it in the storage unit 107. When there is a change in the number of arrays included in the requested image source information array data before and after an array is updated, the video control unit 106 changes a requested image source number change flag according to this change and stores the flag in the storage unit 107. The video control unit 106 then determines the status of the requested image source number change flag, and, when the flag is set, generates a time division process event. When the number of requested image sources is larger than 0, the video control unit 106 further transmits the requested image source information (i.e., consisting of the requested image source identification information and the requesting monitor address information) and the number of requested image sources to the video memory control unit 105.

Based on the requested image source information (consisting of the requested image source identification information and the requesting monitor address information), which is included in the instruction for making a request for transmission of an image source, and the number of requested image sources from the video control unit 106, the video memory control unit 105 refers to image source addresses stored in the storage unit 107, adds addresses that vary in the order that corresponding video signals are transmitted to divided parts of the image source to be transmitted, which is stored in the video memory 104, changes the periodicity of the time division based on the number of requested image sources, and instructs the video memory 104 to carry out time division transmission which enables users to recognize moving objects.

This time division transmission is based on the premise that it is necessary to transmit video signals at a rate of more than 30 frames per second (corresponding to the amount of TV image information included in one frame) or 24 frames per second (corresponding to the amount of image information included in one frame of a movie film) so that users can recognize moving objects displayed on a monitor. When transmitting video signals at a rate of 30 frames per second, if the lowest length of time required for users to recognize moving objects is 1/30 seconds, the video memory control unit 105 changes a transmission unit time for the time division as the number of divisions, which is the number of request image sources, changes in such a manner that the video memory control unit 105 sets the transmission unit time according to the number of divisions as follows: the video memory control unit 105 sets the transmission unit time to 1/30 seconds when the number of requested image sources is 1, the video memory control unit 105 sets the transmission unit time to 1/60 seconds when the number of requested image sources is 2, and the video memory control unit 105 sets the transmission unit time to 1/90 seconds when the number of requested image sources is 3, for example. This method is called the periodic time division method. In accordance with the periodic time division method, the transmission unit time is given by the following equation:

Transmission unit time=lowest length of time required for users to recognize moving objects/number of divisions (i.e., number of requested image sources)

The video control unit 106 adds a corresponding monitor address to the head of each video signal to be time-division-transmitted from the video memory 104. The video memory 104 transmits video signals in units of the transmission unit time determined according to the periodic time division method.

Figure 2:
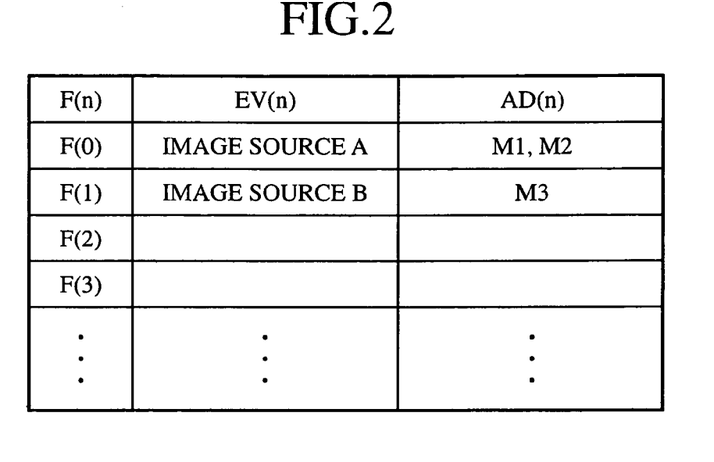
FIG. 2 is a diagram showing an array of requested image source information stored in a storage unit shown in FIG. 1.

FIG. 2 is a diagram showing arrays F(n) each indicating requested image source information, which are stored in the storage unit 107, where n is a variable specifying each array. Each array F(n) consists of EV(n) (i.e., requested image source identification information) indicating an image source requested by at least one of the plurality of monitors and AD(n) (i.e., requesting monitor address information) indicating the address of at least the monitor which has made a request for transmission of the image source. As shown in FIG. 2, in the first array F(0), identification information identifying the first image source A is stored as EV(0), and M1 and M2 are stored as AD(0), and, in the second array F(1), identification information identifying the second image source B is stored as EV(1) and M3 is stored as AD(1), for example. In other words, FIG. 2 shows a group of arrays each consisting of (requested image source identification information, requesting monitor address information), in which a plurality of pieces of requested image source identification information that differ from one another and a plurality of pieces of request monitor address information are arranged in pairs, respectively.

Figure 3:
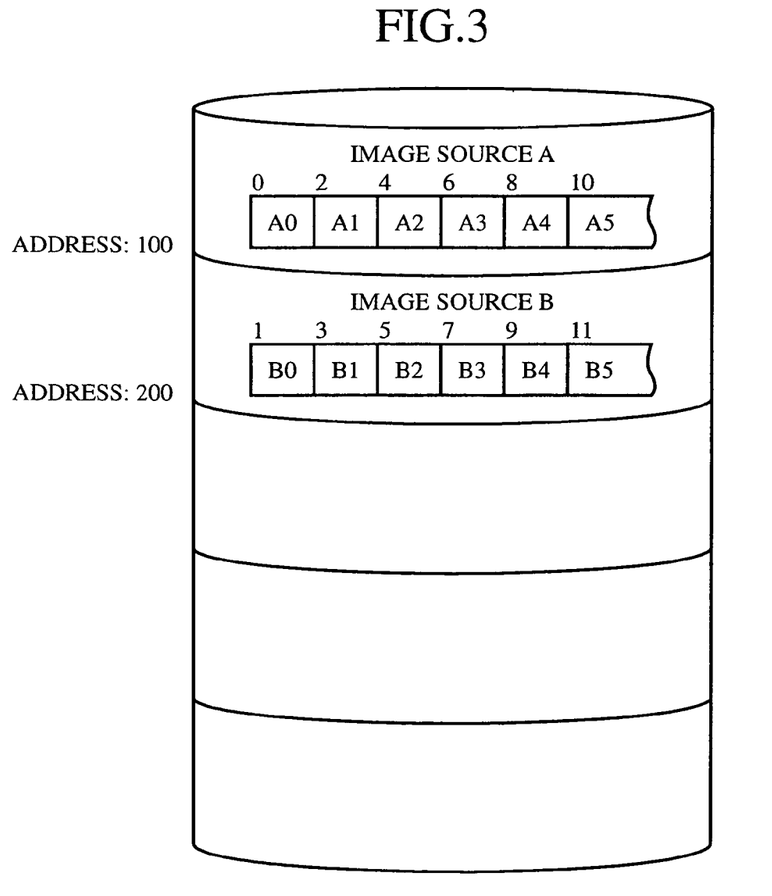
FIG. 3 is a diagram showing requested image sources stored in a video memory shown in FIG. 1, addresses being added to divided parts of each of the requested image sources.

As shown in FIG. 3, the video memory control unit 105 adds addresses to divided parts of each of the plurality of requested image sources stored in the video memory 104 (e.g., the first image source A and the second image source B) based on the number of divisions (i.e., the number of requested image sources), the addresses varying in the order that the corresponding parts of each of the plurality of requested image sources are read from the video memory 104. In other words, based on the array data as shown in FIG. 2, the video memory control unit 105 transmits the two image sources A and B in the order as shown in FIG. 3 by using the periodic time division method. In this case, because the number of requested image sources is 2, the transmission unit time required for transmission of each of the two image sources A and B is set to 1/60 seconds.

Figure 4:
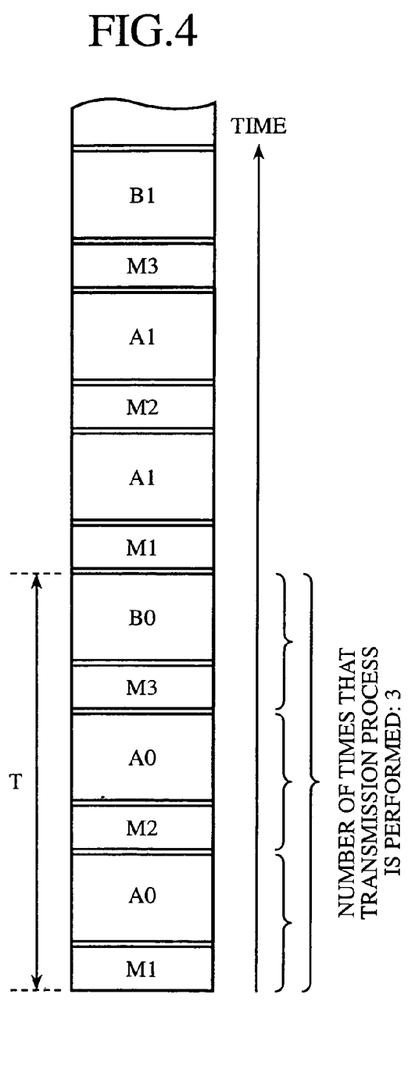
FIG. 4 is a diagram showing a video signal transmitted in accordance with a prior art time division transmission method.

FIG. 4 is a diagram showing video signals transmitted by using a prior art time division transmission method when each of the first and second monitors M1 and M2 makes a request for transmission of the first image source A, and the third monitor M3 makes a request for transmission of the second image source B. As shown in the figure, those image sources to which the addresses of the monitors which have made a request are respectively added are sequentially transmitted with time as follows: (M1, image source A0), (M2, image source A0), (M3, image source B0), (M1, image source A1), (M2, image source A1), (M3, image source B1), and so on, where the first item within each parenthesis indicates the address of a monitor which has made a request for transmission of an image source and the second item within each parenthesis indicates part of the requested image source.

Figure 5:
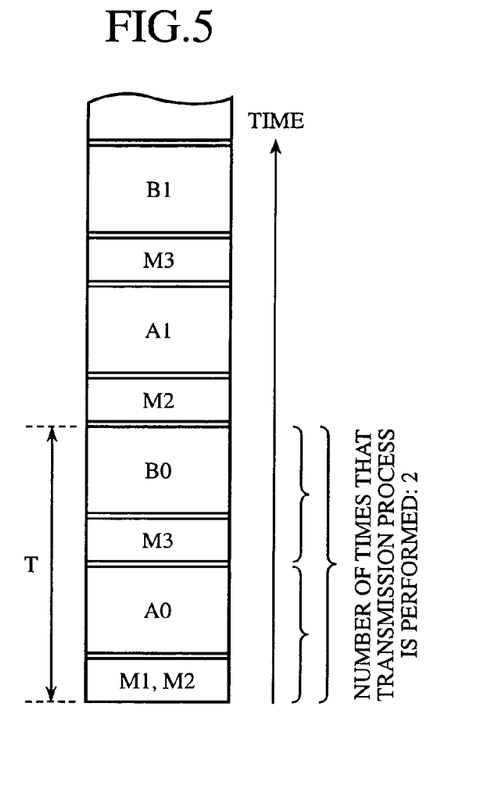
FIG. 5 is a diagram showing a video signal transmitted in accordance with a time division transmission method of embodiment 1 of the present invention.

FIG. 5 is a diagram showing video signals transmitted by using the time division transmission method in accordance with the present embodiment when each of the first and second monitors M1 and M2 makes a request for transmission of the first image source A, and the third monitor M3 makes a request for transmission of the second image source B. As previously mentioned, the information transmission apparatus 100 can receive an instruction indicating an information transmission request, i.e., an instruction including requested image source information that is an array consisting of (requested image source identification information, requesting monitor address information), from each monitor. In other words, in the case as shown in FIG. 5, the information transmission apparatus 100 receives (A, M1), (A, M2), and (B, M3) from the first through third monitors M1, M2, and M3, respectively. As a result, as shown in the figure, the information transmission apparatus 100 sequentially transmits those image sources, to which the addresses of the monitors which have made a request are respectively added, with time as follows: (M1 and M2, image source A0), (M3, image source B0), (M1 and M2, image source A1), (M3, image source B1), and so on, where the first item within each parenthesis indicates the address of one or more monitors which have made a request for transmission of an image source and the second item within each parenthesis indicates part of the requested image source.

Therefore, when transmitting an identical image source to a plurality of monitors, because the information transmission apparatus 100 in accordance with the present embodiment need not repeatedly transmit the same image source to the plurality of monitors, unlike the prior art information transmission apparatus as shown in FIG. 4, the amount of transmission processes can be greatly decreased.

It should be noted that T is a unit time of 1/30 seconds in FIG. 5. Therefore, each of those image sources A and B is compressed into one half thereof, and each frame of each of the image sources is 1/60 seconds in time length. Because an actual amount of data about each piece of requesting monitor address information differs from the one as illustrated in FIG. 5, and is extremely lower than the amount of data about each image source, the addition of requesting monitor address information to each image source data has no influence upon the compressibility of the transmission data.

Figure 6:
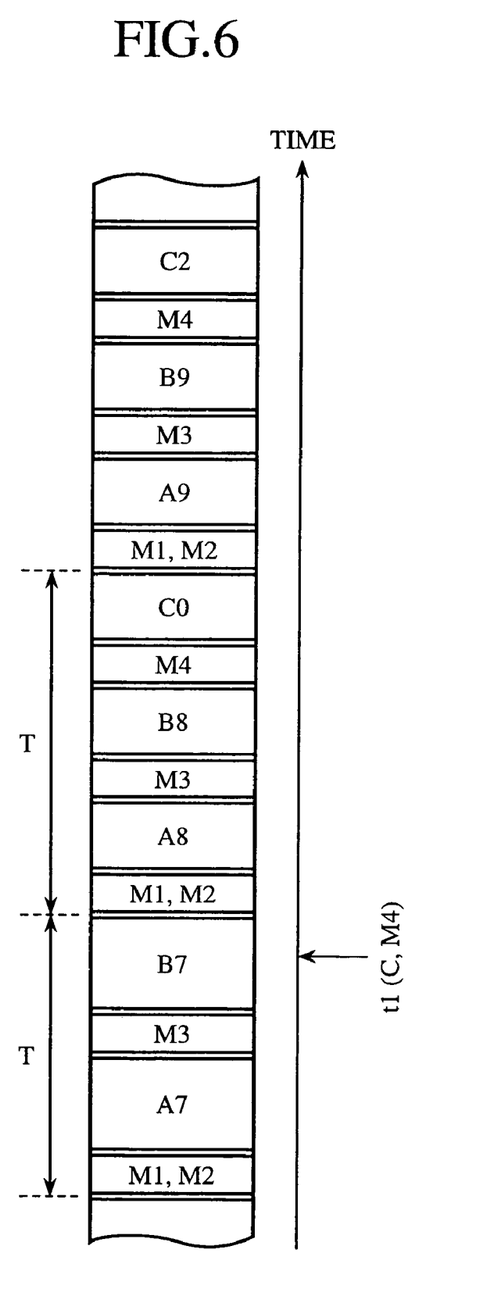
FIG. 6 is a diagram showing a video signal transmitted in accordance with the time division transmission method of embodiment 1 of the present invention when the number of requested image sources increases.

FIG. 6 is a diagram showing video signals which the information transmission apparatus 100 transmits by using the time division transmission method in accordance with the present embodiment when newly receiving (C, M4) from the fourth monitor M4, as an array consisting of (requested image source identification information, requesting monitor address information), at a time of t1 while transmitting the image sources as shown in FIG. 5. In other words, FIG. 6 shows video signals which the information transmission apparatus 100 transmits by using the time division transmission method when the fourth monitor M4 makes a request for transmission of the third image source C 113 input to the video capture 103 shown in FIG. 1. In this case, after sequentially transmitting two time-division multiplexed data (M1 and M2, image source A7) and (M3, image source B7) to the monitors M1 to M3 in one unit time T, the information transmission apparatus 100 sequentially transmits three time-division multiplexed data (M1 and M2, image source A8), (M3, image source B8), (M4, image source C0) to the first through fourth monitors M1 to M4 in the next unit time T. In this case, because the information transmission apparatus 100 transmits the three types of image sources after the time t1, the number of divisions in unit time T is made to change from "2" to "3" and each frame of each of the plurality of image sources is compressed to 1/3 of 1/60 seconds in time length.

Figure 7:
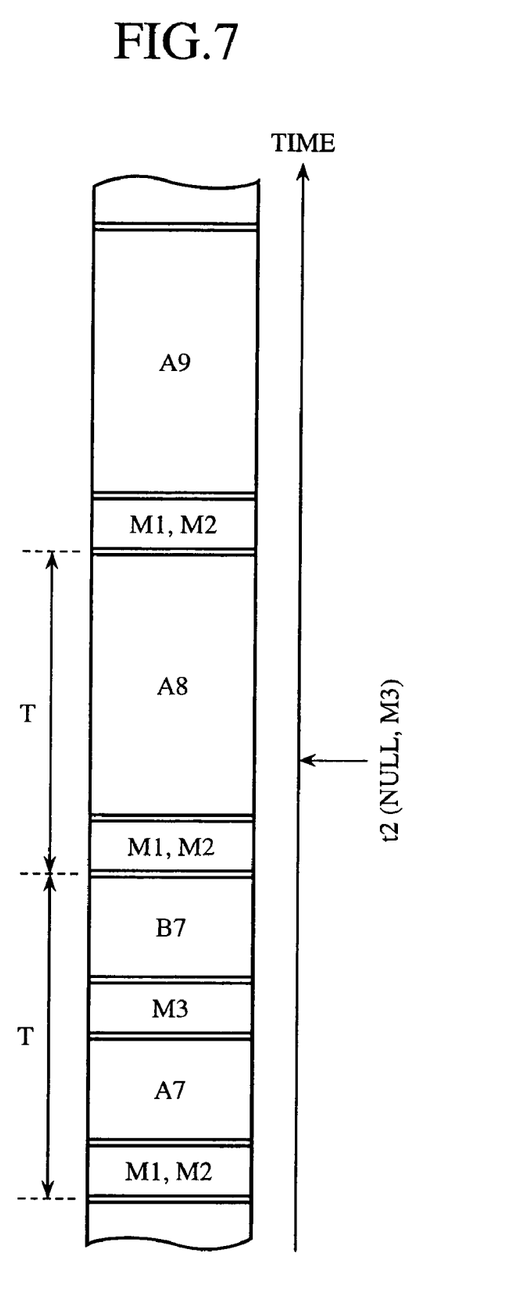
FIG. 7 is a diagram showing a video signal transmitted in accordance with the time division transmission method of embodiment 1 of the present invention when the number of requested image sources decreases.

FIG. 7 is a diagram showing video signals which the information transmission apparatus 100 transmits by using the time division transmission method in accordance with the present embodiment when newly receiving (NULL, M3) from the third monitor M3, as an array consisting of (requested image source identification information, requesting monitor address information), at a time of t2 while transmitting the image sources as shown in FIG. 5. NULL (i.e., a null character) means an instruction for stopping the transmission of a corresponding image source. In this case, after sequentially transmitting two time-division multiplexed data (M1 and M2, image source A7) and (M3, image source B7) to the monitors M1 to M3 in unit time T, the information transmission apparatus 100 sequentially transmits time-division multiplexed data (M1 and M2, image source A8) and (M1 and M2, image source A9) to the monitors M1 and M2 in the next unit times T. In this case, because the information transmission apparatus 100 transmits only one type of image source after the time t2, the number of divisions in unit time T is made to change from "2" to "1".

Figure 8:
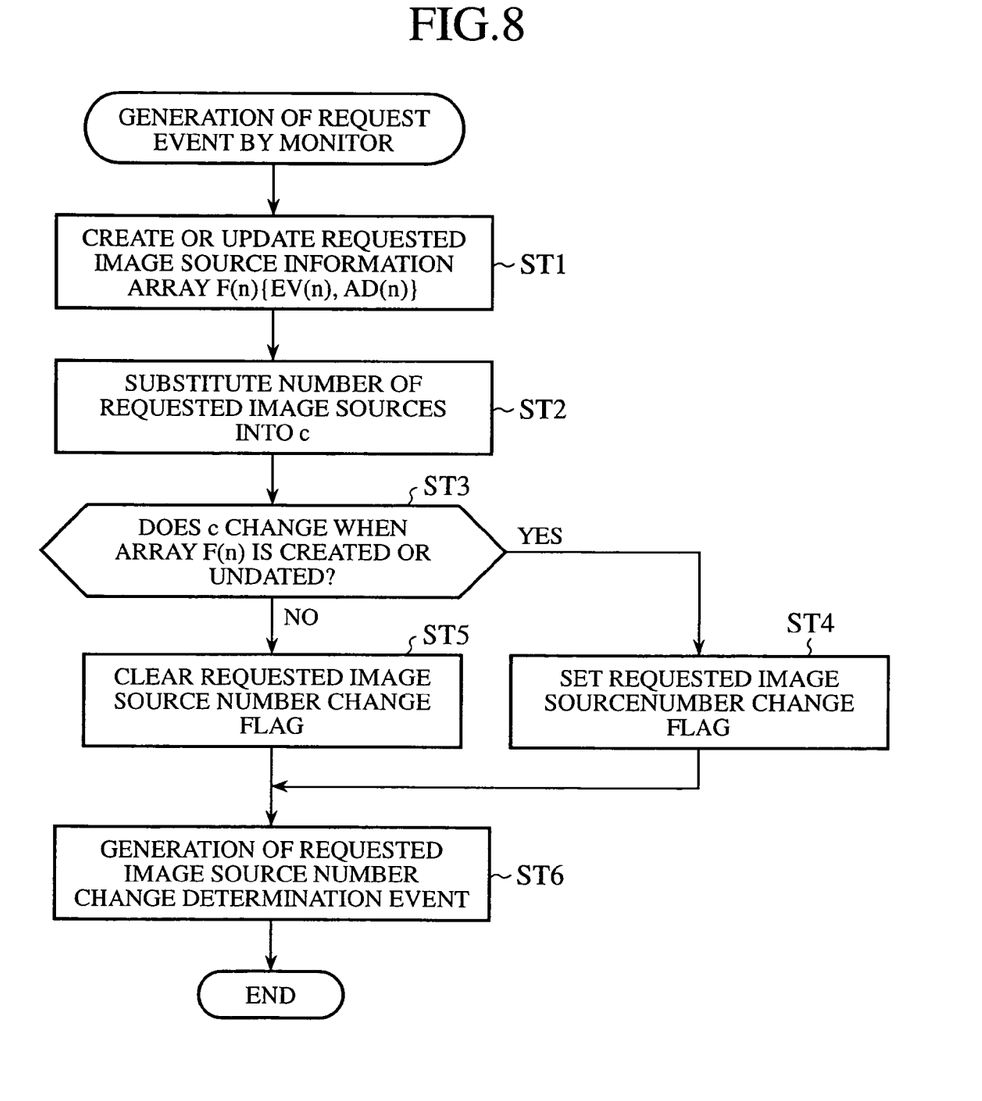
FIG. 8 is a flow chart showing an operation of a video control unit shown in FIG. 1 when an image source transmission request event is generated.

Next, the operation of the information transmission method which is performed by the video control unit 106 will be explained with reference to flow charts shown in FIGS. 8 to 12. FIG. 8 is a flow chart showing an operation of the video control unit 106 when a monitor makes a request for transmission of an image source. When an image source transmission request event occurs (i.e., a monitor makes a request for transmission of an image source), the video control unit 106 uses requested image source identification information X and monitor address information Y associated with the image source transmission request event so as to update a corresponding requested image source information array consisting of (requested image source identification information, requesting monitor address information) which is stored in the storage unit 107 and contains the requested image source identification information X as the first item thereof, i.e., F(n) {EV(n), AD(n)} (n=either one of 1 to c−1), or newly create a requested image source information array F(c) containing EV(c)=the requested image source identification information X as the first item thereof, and AD(c)=the requesting monitor address information Y as the second item thereof. The video control unit 106 then stores either the updated F(n) or newly-created F(c) in the storage unit 107 (in step ST1).

After performing the process of step ST1, the video control unit 106 counts the number of requested image source information arrays F (0), F (1), F (2), . . . which are stored in the storage unit 107, i.e., the number of requested image sources, and substitutes the counted value into the number c of requested image sources stored in the storage unit 107 (in step ST2). After performing the process of step ST2, the video control unit 106 then checks to see whether the number c of requested image sources stored in the storage unit 107 changes after performing the process of step ST2 (in step ST3).

When determining that the number c of requested image sources changes in step ST3, the video control unit 106 sets the requested image source number change flag stored in the storage unit 107 (in step ST4). On the other hand, when determining that the number c of requested image sources does not change in step ST3, the video control unit 106 clears the requested image source number change flag stored in the storage unit 107 (in step ST5). After performing the process of step ST5 or step ST4, the video control unit 106 generates a requested image source number change determination event (in step ST6), and finishes the processing of this flow.

Figure 9:
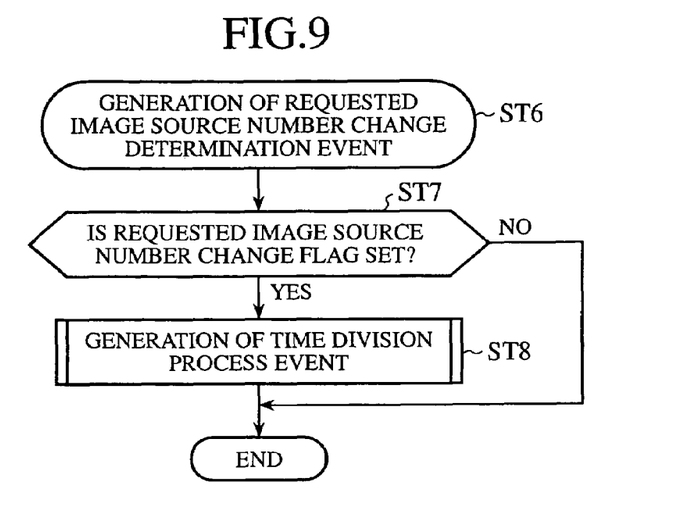
FIG. 9 is a flow chart showing an operation of the video control unit shown in FIG. 1 when a requested image source number change determination event is generated.

FIG. 9 is a flow chart shows a process when a requested image source number change determination event is generated in step ST6 of the flow chart of FIG. 8. When a requested image source number change determination event is generated, the video control unit 106 determines whether the requested image source number change flag stored in the storage unit 107 is set or cleared (in step ST7). The video control unit 106 generates a time division process event when the requested image source number change flag stored in the storage unit 107 is set (in step ST8). In contrast, when the requested image source number change flag stored in the storage unit 107 is cleared, the video control unit 106 stops the processing of this flow.

Figure 10:
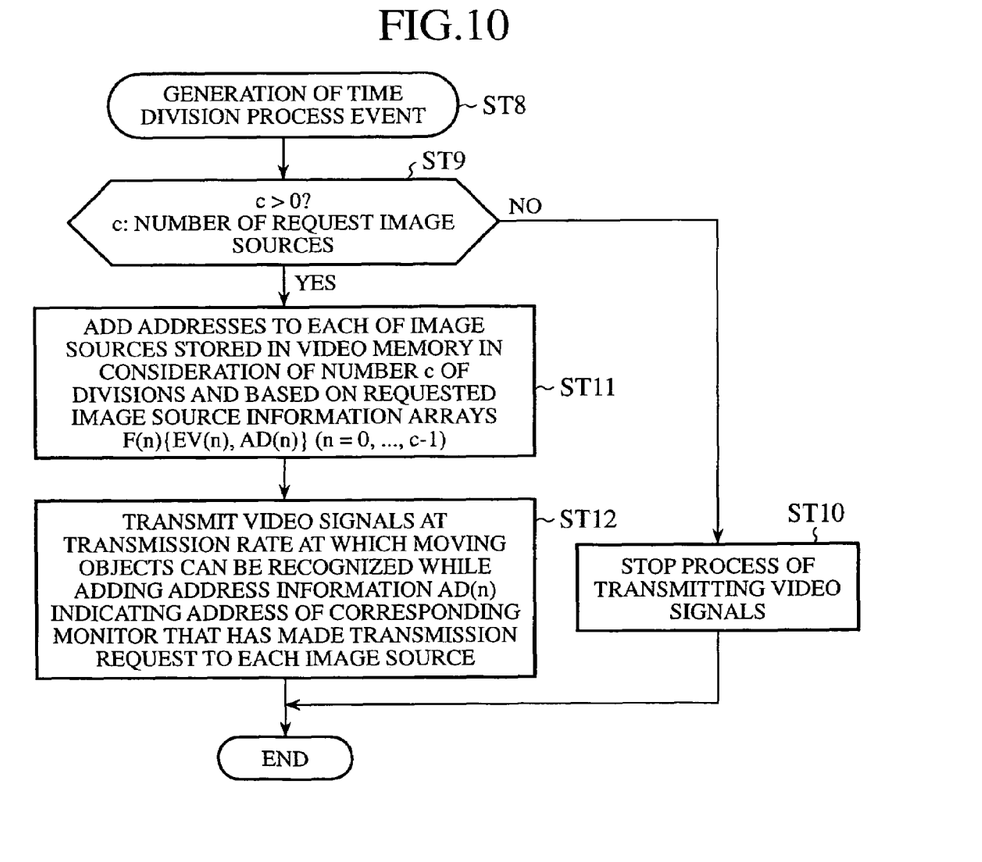
FIG. 10 is a flow chart showing an operation of the video control unit shown in FIG. 1 when a time division process event is generated.

FIG. 10 is a flow chart showing the operation of the video control unit 106 when a time division process event is generated in step ST8 of the flow chart of FIG. 9. The video control unit 106 checks to see whether or not the number c of requested image sources stored in the storage unit 107 is larger than 0 when a time division process event is generated (in step ST9). When determining that the number c of requested image sources is equal to or less than 0 in step ST9, the video control unit 106 causes the video memory 104 to stop the video signal transmission processing (in step ST10), and finishes the processing of this flow.

When determining that the number c of requested image sources is larger than 0, in step ST9, the video control unit 106 causes the video memory control unit 105 to add addresses, which vary in the order that corresponding video signals are transmitted by using the time division multiplexing method, to divided parts of each of the plurality of image sources stored in the video memory 104 based on both the plurality of requested image source information arrays F(n) {EV(n), AD(n)} (n=1 to c−1) stored in the storage unit 107 and in consideration of the number c of requested image sources stored in the storage unit 107 (in step ST11). After performing the process of step ST11, the video control unit 106 adds corresponding requesting monitor address information to the head of a video signal of each part of each image source transmitted at a transmission rate at which users can recognize on-screen moving objects from the video memory 104 (in step ST12), and then finishes the processing of this flow.

Figure 11:
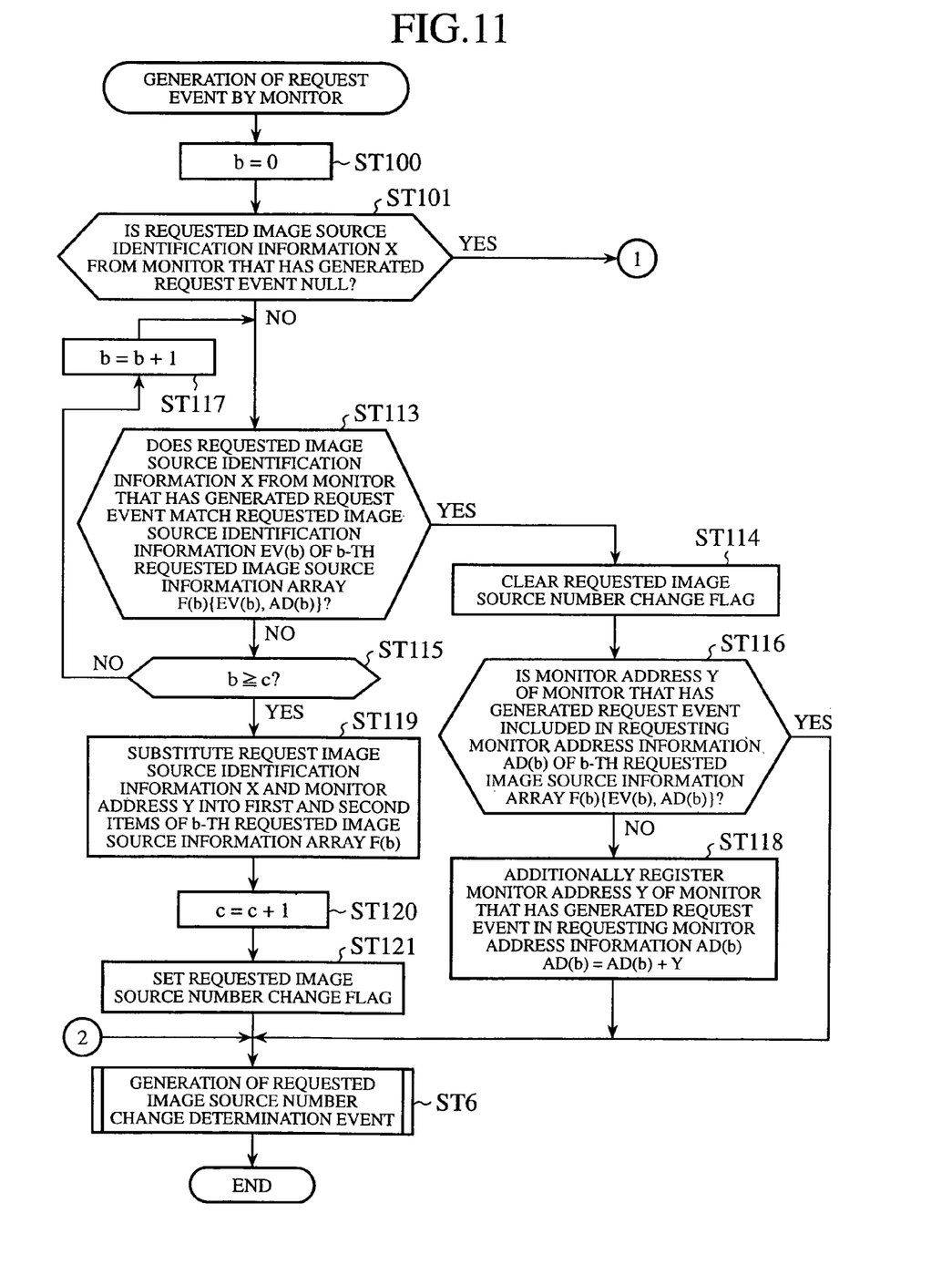
FIG. 11 is a flow chart showing the details of the operation of the video control unit shown in FIG. 1 when an image source transmission request event is generated.
Figure 12:
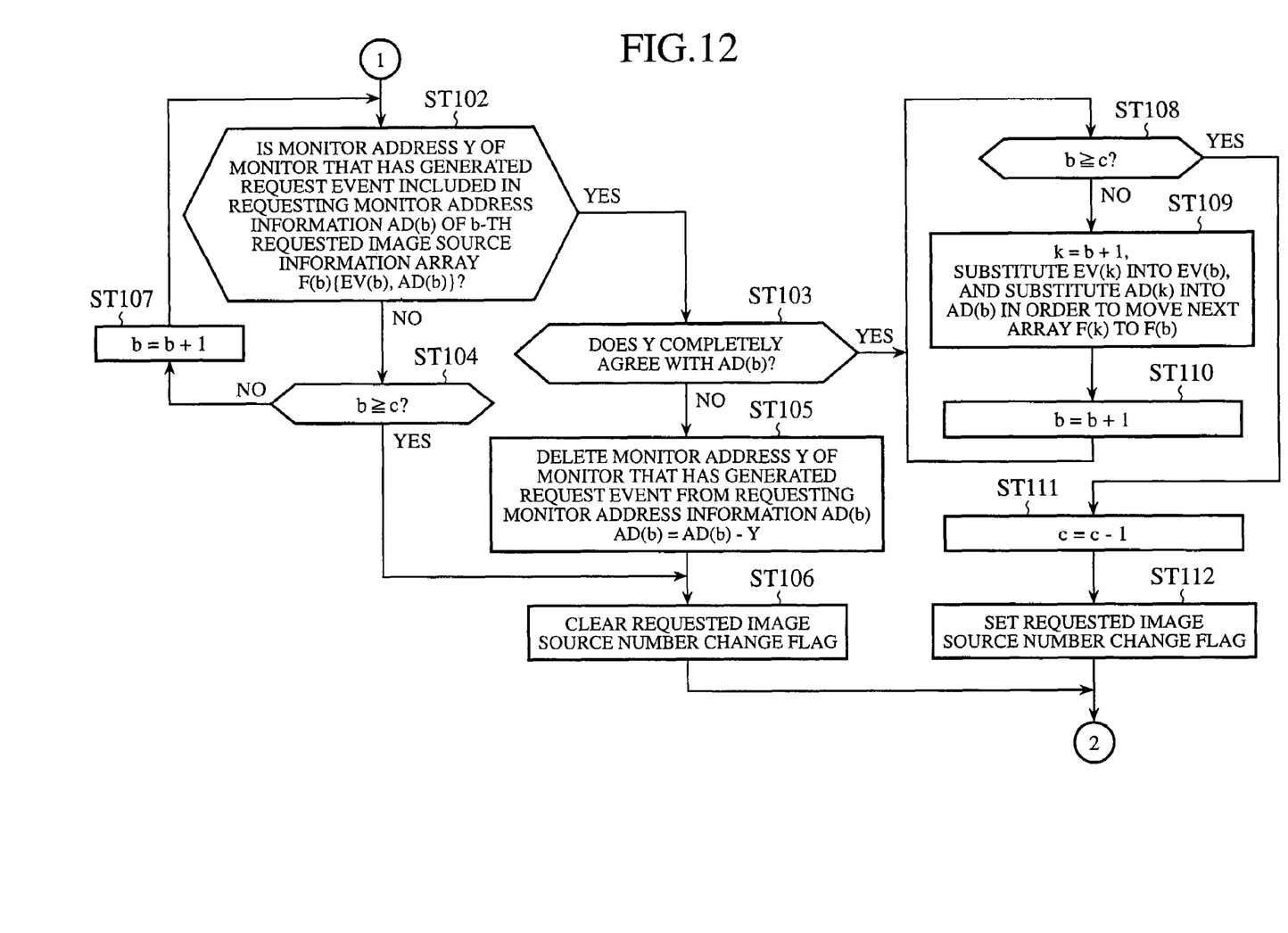
FIG. 12 is a flow chart showing the details of the operation of the video control unit shown in FIG. 1 when an image source transmission request event is generated.

FIGS. 11 and 12 are flow charts showing the details of the operation of the video control unit when an image source transmission request event indicating a request for transmission of an image source made by a monitor is generated. When receiving an image source transmission request event indicating a request for transmission of an image source from one of the plurality of monitors, the video control unit 106 substitutes an initial value "0" into a pointer b that specifies the variable n of the requested image source array F(n) stored in the storage unit 107 (in step ST100). In other words, the video control unit 106 specifies the first array F(0). After performing the process of step ST100, the video control unit 106 checks to see whether or not the requested image source information X associated with the image source transmission request event generated by the monitor is NULL (in step ST101). In other words, the video control unit 106 checks to see whether or not the monitor has made a request for stopping the transmission of the corresponding image source.

When determining that the requested image source identification information X associated with the image source transmission request event generated by the monitor is NULL, in step ST101, the video control unit 106 checks to see whether or not the monitor address Y of the monitor that has generated the image source transmission request event is included in the requesting monitor address information AD(b) of the b-th requested image source information array F(b) consisting of (requested image source identification information, requesting monitor address information), i.e., {EV(b), AD(b)}, which is stored in the storage unit 107 (in step ST102).

When determining that the monitor address Y of the monitor that has generated the image source transmission request event is not included in the requesting monitor address information AD(b) of the b-th requested image source information array F(b) consisting of (requested image source identification information, requesting monitor address information), i.e., {EV(b), AD(b)}, which is stored in the storage unit 107, in step ST102, the video control unit 106 further determines whether or not the pointer b is equal to or greater than the number c of requested image sources or whether or not the pointer b is smaller than the number c of requested image sources (in step ST104). When determining that the pointer b is smaller than the number c of requested image sources, the video control unit 106 increments the pointer b by "1" (in step ST107).

The video control unit 106 then, in step ST102, checks to see whether or not the monitor address Y is included in the requesting monitor address information AD(b) again. When determining that the monitor address Y is not included in the requesting monitor address information AD(b), in step ST102, the video control unit 106, in step ST107, increments the pointer b by "1" and then returns to step ST102 again. Thus, the video control unit 106 repeatedly searches for an array F(b) having AD(b) including the monitor address Y while incrementing the pointer b by "1".

When determining that the monitor address Y of the monitor that has generated the image source transmission request event is included in the request monitor address information AD(b) of the b-th requested image source information array F(b) consisting of (requested image source identification information, requesting monitor address information), i.e., {EV(b), AD(b)}, which is stored in the storage unit 107, in step ST102, the video control unit 106 further determines whether or not Y=AD(b), i.e., whether the b-th requested image source information array F(b) completely matches the requested image source information (X, Y) associated with the image source transmission request event (in step ST103).

When determining that the b-th requested image source information array F(b) does not completely match the requested image source information (X, Y) associated with the image source transmission request event, for example, when array data as shown in FIG. 2 are stored in the storage unit 107 and the requested image source information (X,Y) associated with the image source transmission request event is (NULL, M2), in step ST103, the video control unit determines that the requested image source information (X,Y) doesn't completely match a corresponding stored array consisting of (image source A, M1 and M2). In this case, the video control unit 106 deletes the monitor address Y=M2 of the monitor which has generated the image source transmission request event from the requesting monitor address information AD(b)=M1 and M2 (in step ST105). Therefore, when the requested image source information (X,Y) is (NULL, M2), the video control unit 106 changes the stored array consisting of (image source A, M1 and M2) to an array consisting of (image source A, M1) by deleting the monitor address Y=M2 of the monitor which has generated the image source transmission request event from the second item of the stored array consisting of (image source A, M1 and M2).

During the process of searching for the b-th requested image source information array F(b) having AD(b) including the monitor address Y while incrementing the pointer b by 1, when the pointer b becomes equal to or larger than the number c of requested image sources, the video control unit 106 determines that no array F(n) having AD(n) including the monitor address Y as the second item is stored in the storage unit 107. In other words, when the pointer b becomes equal to or larger than the number c of requested image sources, because the requested image source information (X=NULL, Y) from the monitor is associated with an erroneous instruction and all the arrays stored in the storage unit 107 don't change, the video control unit 106 can determine that there is no change in the number c of requested image sources. In this case, the video control unit 106 clears the requested image source number change flag (in step ST106).

When the video control unit 106 deletes the monitor address Y of the monitor which has generated the image source transmission request event from the requesting monitor address information AD(b), in step ST105, there is no change in the number c of requested image sources because an array consisting of corresponding requested image source identification information and another monitor address remains stored in the storage unit 107. In this case, the video control unit 106 clears the requested image source number change flag (in step ST106).

On the other hand, when the b-th requested image source information array F(b) completely matches the requested image source information (X, Y) associated with the image source transmission request event made by the monitor, in step ST103, the video control unit 106 determines that the b-th requested image source information array F(b) includes the requested image source identification information X that specifies the image source that is the target of the NULL instruction (i.e., the instruction for stopping the transmission of the image source) and includes only the monitor address Y as the second item thereof. Therefore, in this case, the video control unit 106 deletes the b-th requested image source information array F(b) including the requested image source identification information X from the storage unit 107. In the example of FIG. 2, when the requested image source information associated with the image source transmission request event is (NULL=image source B, M3), the video control unit 106 deletes the second array F(1) from the storage unit 107.

Therefore, in order to delete the b-th requested image source information array F(b), the video control unit 106 sequentially decrements the index n, which is larger than the pointer b (i.e. n=b+1 to c−1), of the n-th array F(n) by 1. When the b-th requested image source information array F(b) completely matches the requested image source information (X, Y) associated with the image source transmission request event made by the monitor, in step ST103, the video control unit 106 determines whether or not the pointer b is equal to or greater than the number c of requested image sources or whether or not the pointer b is smaller than the number c of requested image sources (in step ST108).

Concretely, when determining that the pointer b is smaller than the number c of requested image sources, the video control unit 106 moves the next array F(k) to the b-th array F(b) by substituting the sum of the pointer b and "1" into the variable k, substituting EV(k) into EV(b), and substituting AD(k) into AD(b) (in step ST109). The video control unit 106 sets the c-th array F(c) that is placed just behind the c−1-th array F(c−1) to be a blank array. The video control unit 106 then increments the pointer b by "1" (in step ST110) in order to increment the pointer k used for the array moving process of step ST109 by "1". The video control unit 106 then returns to step ST108 in which the video control unit 106 determines whether or not the pointer b is equal to or larger than the number c of requested image sources or whether or not the pointer b is smaller than the number c of requested image sources again.

As long as the pointer b is smaller than the number c of requested image sources, in step ST108, the video control unit 106 sequentially decrements the index n, which is larger than the pointer b, of the n-th array F(n) by 1 by substituting EV(k) into EV(b) and substituting AD(k) into AD(b). When the pointer b is equal to or larger than the number c of requested image sources, in step ST108, the video control unit 106 determines that the array moving process is completed. After that, the video control unit 106 substitutes a value obtained by subtracting "1" from the number c of requested image sources stored in the storage unit 107 into the number c of requested image sources (in step ST111). In this case, because the number of divisions changes, the video control unit 106 sets the requested image source number change flag stored in the storage unit 107 (in step ST112).

On the other hand, when determining that the requested image source identification information X included in the requested image source information from the monitor that has generated the image source transmission request event is other than NULL, in step ST101, the video control unit 106 checks to see whether or not the requested image source identification information X from the monitor that has generated the image source transmission request event matches the requested image source identification information EV(b) of the b-th requested image source information array F(b) consisting of (requested image source identification information, requesting monitor address information), i.e., {EV(b), AD(b)}, which is stored in the storage unit 107 (in step ST113).

When determining that the requested image source identification information X from the monitor that has generated the image source transmission request event doesn't match the requested image source identification information EV(b) of the b-th requested image source information array F(b) {EV(b), AD(b)}, which is stored in the storage unit 107, in step ST113, the video control unit 106 determines whether or not the pointer b stored in the storage unit 107 is equal to or larger than the number c of requested image sources or whether or not the pointer b is smaller than the number c of requested image sources (in step ST115).

When the pointer b is smaller than the number c of requested image sources, the video control unit 106 increments the pointer b by "1" in order to specify the next array which is next to the b-th requested image source information array F(b) specified by the pointer b (in step ST117). The video control unit 106 then, in step ST113, determines whether or not the requested image source identification information EV(b) of the next array matches the requested image source identification information X from the monitor that has generated the image source transmission request event again.

When determining that the requested image source identification information X from the monitor that has generated the image source transmission request event matches the requested image source identification information EV(b) of the b-th requested image source information array F(b) {EV(b), AD(b)}, which is stored in the storage unit 107, in step ST113, the video control unit 106 doesn't update the number c of requested image sources because the requested image source identification information X has already existed in the storage unit 107 as the first item of the array F(b). As a result, the video control unit 106 clears the requested image source number change flag stored in the storage unit 107 (in step ST114), and checks to see whether or not the monitor address Y of the monitor that has generated the image source transmission request event is included in the requesting monitor address information AD(b) of the b-th requested image source information array F(b) {EV(b), AD(b)} (in step ST116).

When determining that the monitor address Y of the monitor that has generated the image source transmission request event is not included in the requesting monitor address information AD(b) of the b-th requested image source information array F(b) {EV(b), AD(b)}, in step ST116, the video control unit 106 additionally registers the monitor address Y of the monitor that has generated the image source transmission request event in the requesting monitor address information AD(b) (in step ST118).

When determining that the pointer b is equal to or larger than the number c of divisions (i.e., the number of requested image sources) stored in the storage unit 107, in step ST115, the video control unit 106 additionally registers an array F(b) by substituting the requested image source identification information X and the monitor address Y of the monitor that has generated the image source transmission request event into the first and second items of the array, respectively, because the requested image source identification information X associated with the image source transmission request event is not included in any array stored in the storage unit 107 (in step ST119). In this case, because the number of requested image sources increases, the video control unit 106 increments the number c of requested image sources stored in the storage unit 107 by "1" (in step ST120), and then sets the requested image source number change flag (in step ST121).

After setting the requested image source number change flag in step ST112 or step ST121, additionally registering the monitor address Y in step ST118, or clearing the requested image source number change flag in step ST106, the video control unit 106 performs the process of generating a requested image source number change determination event as shown in the flow chart of FIG. 9 (in step ST6), and finishes this flow.

As mentioned above, in accordance with this embodiment 1, the image transmission apparatus receives a request for transmission of an image source from either one of the plurality of monitors having respective inherent addresses by way of the common cable 108 via which the image transmission apparatus is connected with the plurality of monitors, analyzes both requested image source identification information indicating the requested image source and a monitor address, which are associated with the image source transmission request, refers to the storage unit 107 for storing one or more arrays each indicating a correspondence between one of a plurality of image sources and one or more monitor addresses based on analysis results, and transmits the requested image source to the monitor while adding corresponding monitor addresses to the image source. Therefore, the present embodiment offers an advantage of being able to, even when each of a plurality of monitors makes a request for transmission of an image source, respectively transmit a plurality of image sources to them by way of the single connection line. The present embodiment offers another advantage of being able to, even when a plurality of monitors make a request for transmission of an identical image source, prevent the identical image source from being repeatedly transmitted to the plurality of monitors.

Furthermore, when the video control unit 106 receives request events each indicating a request for transmission of an identical image source from two or more monitors, the video monitor control unit 105 of the information transmission apparatus of this embodiment 1 adds two or more corresponding monitor addresses to the same image source associated with the image source transmission request events. Therefore, the same image source can be prevented from being repeatedly transmitted to the two or more monitors.

Furthermore, when receiving an image source transmission request event, the video control unit 106 of the information transmission apparatus in accordance with this embodiment 1 adds only the monitor address of a monitor that has generated the image source transmission request event to an array stored in the storage unit 107 if the requested image source identification information associated with the image source transmission request event exists in the array, and additionally registers an array consisting of the requested image source identification information and the monitor address in the storage unit 107 if the requested image source identification information doesn't exist in any array stored in the storage unit 107. Therefore the present embodiment offers a further advantage of being able to reasonably change the array data stored in the storage unit 107 according to the image source transmission request event.

In addition, when transmitting two or more requested image sources, the video control unit 106 of the information transmission apparatus in accordance with this embodiment 1 transmits the two or more requested image sources in units of a predetermined transmission unit time while carrying out time division processing according to the number of requested image sources. Therefore the present embodiment offers a further advantage of being able to transmit image source signals in a predetermined time frame with a higher degree of efficiency.

Furthermore, the video control unit 106 of the information transmission apparatus in accordance with this embodiment 1 newly carries out time division processing only when a newly-received image source transmission request event causes a change in the number of requested image sources to be transmitted in units of a predetermined transmission unit time. Therefore the present embodiment offers another advantage of being able to prevent useless processes followed by the time division processing from being unconditionally carried out in response to every newly-received image source transmission request event.

In addition, in accordance with this embodiment 1, the image transmission apparatus 100 and the plurality of monitors are connected with each other by way of the single cable that is a common connection line. Therefore, the present embodiment offers a further advantage of being able to prevent the addition of another connection line even when the number of monitors increases.

Furthermore, in accordance with this embodiment 1, the video memory 104 for storing image sources which the video control unit 106 can read to transmit them to monitors can consist of a hard disk. Therefore, the present embodiment offers another advantage of being able to prevent any change in the system by only increasing the storage capacity of the hard disk even when the maximum amount of data about requested image sources to be transmitted increases.

In accordance with this embodiment 1, the information transmission apparatus for transmitting image sources to monitors is explained as an example. However, information transmitted by the information transmission apparatus in accordance with the present invention is not limited to image sources. The information transmission apparatus in accordance with the present invention can be applied to transmission of such information as music information or so-called streaming information that varies with time.

Many widely different embodiments of the present invention may be constructed without departing from the spirit and scope of the present invention. It should be understood that the present invention is not limited to the specific embodiments described in the specification, except as defined in the appended claims.

What is claimed is:

1. An information transmission apparatus comprising:

request analyzing means for receiving an instruction including both a request for transmission of specific information and an identifier from one of a plurality of information processing apparatus connected with said information transmission apparatus by way of a common connection line, said identifier identifying said information processing apparatus that has made the transmission request and said plurality of information processing apparatus having their respective identifiers, and for analyzing the specific information to be transmitted and the identifier associated with said instruction;

storage means for storing array data about arrays each indicating a correspondence between one of a plurality of different pieces of information to be transmitted and at least an identifier identifying one of said plurality of information processing apparatus;

information addition means for adding the identifier associated with said instruction to the specific information associated with said instruction by referring to said storage means based on analysis results from said request analyzing means; and information transmission means for transmitting the specific information to which the identifier is added to the information processing device which has provided said instruction to said information transmission apparatus; and when receiving an instruction indicating a request for transmission of specific information, said request analyzing means adds only an identifier associated with said instruction to said array data if a correspondence between the specific information associated with said instruction and at least one identifier is included in the array data stored in said storage means, and adds both identification information identifying the specific information and the identifier, which are associated with said instruction, to said array data if no correspondence between the specific information associated with said instruction and at least one identifier is included in the array data.

2. The information transmission apparatus according to claim 1, wherein when said request analyzing means receives instructions indicating a request for transmission of identical specific information from two or more of said plurality of information processing apparatus, said information adding means adds two or more identifiers associated with said instructions to the identical specific information associated with said instructions.

3. The information transmission apparatus according to claim 1, wherein when transmitting two or more of different pieces of the specific information, said information transmission means performs time division processing according to a number of different pieces of the specific information to be transmitted and then transmits them in units of a predetermined transmission unit time.

4. The information transmission apparatus according to claim 3, wherein when there is a change in the number of different pieces of specific information to be transmitted in units of the predetermined transmission unit time because of an instruction indicating an information transmission request which said request analyzing means newly receives, said information transmission means newly performs time division processing.

5. The information transmission apparatus according to claim 1, wherein said information transmission means transmits image information about one frame in units of a predetermined transmission unit time.

6. The information transmission apparatus according to claim 1, wherein said common connection line is a single cable.

7. The information transmission apparatus according to claim 1, further comprising a hard disk for storing said plurality of different pieces of information that can be read and transmitted by said information transmission means.

8. An information transmission method comprising:
receiving an instruction including both a request for transmission of specific information and an identifier from one of a plurality of information processing apparatus connected with one another by way of a common connection line, said identifier identifying said information processing apparatus that has made the transmission request and said plurality of information processing apparatus having their respective identifiers;
analyzing the specific information to be transmitted and the identifier associated with said instruction;
storing array data about arrays each indicating a correspondence between one of a plurality of different pieces of information and an identifier identifying at least one of said plurality of information processing apparatus;
adding the identifier associated with said instruction to the specific information associated with said instruction by referring to said array data based on analysis results obtained in said analyzing the specific information; and
transmitting the specific information associated with said instruction to which the
identifier is added to the information processing device which has provided said instruction;
wherein in the receiving the instruction indicating the request for transmission of specific information, the adding of the identifier comprises adding only an identifier associated with said instruction to said array data if a correspondence between the specific information associated with said instruction and at least one identifier is included in the array data stored by the storing the array data, and the adding the identifier comprises adding both identification information identifying the specific information and the identifier, which are associated with said instruction, to said array data if no correspondence between the specific information associated with said instruction and at least one identifier is included in the array data stored by the storing the array data.

9. The information transmission method according to claim 8, wherein if the receiving of the instruction comprises receiving instructions indicating a request for transmission of identical specific information from two or more of said plurality of information processing apparatus, the adding of the identifier comprises adding two or more identifiers associated with said instructions to the identical specific information associated with said instructions.

10. The information transmission method according to claim 8, wherein if the transmitting of the specific information is transmitting two or more of different pieces of specific information, the transmitting of the specific information comprises performing time division processing according to a number of different pieces of specific information to be transmitted and then transmitting the number of different pieces of specific information in units of a predetermined transmission unit time.

11. The information transmission method according to claim 10, wherein, when there is a change in the number of different pieces of specific information to be transmitted in units of the predetermined transmission unit time because the receiving the instruction newly receives an instruction indicating an information transmission request, the transmitting of the specific information further comprises newly performing time division processing according to the changed number of different pieces of the specific information to be transmitted.

12. The information transmission method according to claim 8, wherein said common connection line is a single cable.

13. The information transmission apparatus according to claim 1, wherein the plurality of the information processing apparatus are connected to the information transmission apparatus only via the common connection line.

14. The information transmission apparatus according to claim 13, wherein said common connection line is a single cable.

15. The information transmission method according to claim 8, wherein the plurality of the information processing apparatus are connected to the information transmission apparatus only via the common connection line.

16. The information transmission method according to claim 15, wherein said common connection line is a single cable.

17. The information transmission method according to claim 8, wherein the transmitting further comprises transmitting, via the common connection line, information exclusively to information processing apparatus, among said plurality of the information processing apparatus, whose identifiers are added to the information.

18. The information transmission apparatus according to claim 1, wherein the information transmission means transmits, via the common connection line, information exclusively to information processing apparatus, among said plurality of the information processing apparatus, whose identifiers are added to the information.

* * * * *